US012398501B2

(12) United States Patent
Dunn et al.

(10) Patent No.: US 12,398,501 B2
(45) Date of Patent: Aug. 26, 2025

(54) LAUNDRY APPLIANCE DRAINAGE

(71) Applicant: Haier US Appliance Solutions, Inc., Wilmington, DE (US)

(72) Inventors: David Scott Dunn, Louisville, KY (US); Jivko Ognianov Djerekarov, Louisville, KY (US); Wayne E. Lawson, La Grange, KY (US); Dimitar Tcholakov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 241 days.

(21) Appl. No.: 18/094,728

(22) Filed: Jan. 9, 2023

(65) Prior Publication Data

US 2024/0229335 A1 Jul. 11, 2024

(51) Int. Cl.
*D06F 39/08* (2006.01)
*B01D 46/00* (2022.01)
*D06F 25/00* (2006.01)
*D06F 39/12* (2006.01)
*D06F 58/22* (2006.01)

(52) U.S. Cl.
CPC ....... *D06F 39/083* (2013.01); *B01D 46/0009* (2013.01); *D06F 25/00* (2013.01); *D06F 39/12* (2013.01); *D06F 58/22* (2013.01); *B01D 2279/55* (2013.01)

(58) Field of Classification Search
CPC .................................................. D06F 39/083
See application file for complete search history.

(56) References Cited

U.S. PATENT DOCUMENTS

| 10,087,569 | B2 | 10/2018 | Bocchino |
| 10,619,287 | B2 | 4/2020 | Lu et al. |
| 10,633,785 | B2 | 4/2020 | Bocchino |
| 10,662,594 | B1 | 5/2020 | Lafoy |
| 2017/0350063 | A1* | 12/2017 | Bombardieri ........... D06F 58/22 |
| 2020/0399820 | A1 | 12/2020 | Bombardieri |
| 2021/0156070 | A1* | 5/2021 | Rios Acebal ........... D06F 39/10 |

FOREIGN PATENT DOCUMENTS

| EP | 2436832 B1 | 11/2016 |
| EP | 2719819 B1 | 2/2017 |
| WO | WO2016095968 A1 | 6/2016 |
| WO | WO2022022170 A1 | 2/2022 |
| WO | WO2022142252 A1 | 7/2022 |

* cited by examiner

Primary Examiner — Jason Y Ko
(74) Attorney, Agent, or Firm — Dority & Manning, P.A.

(57) ABSTRACT

A laundry appliance includes a cabinet defining an interior volume with a housing mounted within the interior volume of the cabinet. An air filter is positioned in the housing. The air filter may be positioned upstream of a heating system of the laundry appliance. The laundry appliance also includes a drain path extending through the housing.

20 Claims, 11 Drawing Sheets

LAUNDRY APPLIANCE DRAINAGE

FIELD OF THE INVENTION

The present subject matter relates generally to laundry appliances, and more particularly to drainage features within laundry appliances.

BACKGROUND OF THE INVENTION

Laundry appliances include washing machine appliances, dryer appliances, and combination laundry appliances. Combination laundry appliances, sometimes also referred to as washer/dryer appliances, provide both washing and drying functions in a single unit. During the washing and/or drying operations, particles from clothing articles being treated therein, such as fiber particles, are dislodged and may become entrained in the flow of air through the laundry appliance. Such particles, e.g., lint, may impair the performance of the laundry appliance, such as a heating system thereof, if the particles are carried to, for example, a heater of the heating system, by the flow of air. Thus, laundry appliances, e.g., dryer appliances and combination appliances, typically include at least one air filter, sometimes also referred to as a lint filter, to entrap such particles and remove the particles from the air flow.

Laundry appliances, such as combination appliances, may contain various liquids, such as wash liquid, at various points during the operations thereof. These various liquids are generally removed from the laundry appliance by draining to a sump and pumping out from the sump. However, some such liquids may become entrapped within the laundry appliance such that the liquid accumulates in an undesired area where a volume of the liquid is prevented or obstructed from reaching the sump. For example, in some instances, liquid may become entrapped at or around the air filter or lint filter. The entrapped liquid may lead to issues such as poor consumer perception when the filter is accessed for cleaning, such as when liquid entrapped behind or around the filter escapes as the consumer accesses the filter.

Accordingly, a laundry appliance having improved features for drainage, e.g., around the filter, such as in a filter box or housing of the laundry appliance, would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a laundry appliance is provided. The laundry appliance includes a cabinet that defines an interior volume with a tub mounted within the interior volume of the cabinet. A laundry basket is rotatably mounted within the tub. The laundry basket defines a chamber for the receipt of articles for treatment. The laundry appliance also includes a heating system in thermal communication with the chamber whereby heated air flows from the heating system to the chamber. An air filter is positioned between the laundry basket and the heating system upstream of the heating system, whereby a flow of return air from the chamber passes through and is filtered by the air filter before flowing to the heating system. The laundry appliance also includes a housing. The air filter is positioned within the housing and a drain path extends through the housing.

In another aspect of the present disclosure, a laundry appliance is provided. The laundry appliance includes a cabinet that defines an interior volume with a housing mounted within the interior volume of the cabinet. An air filter is positioned in the housing. The laundry appliance also includes a drain path extending through the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
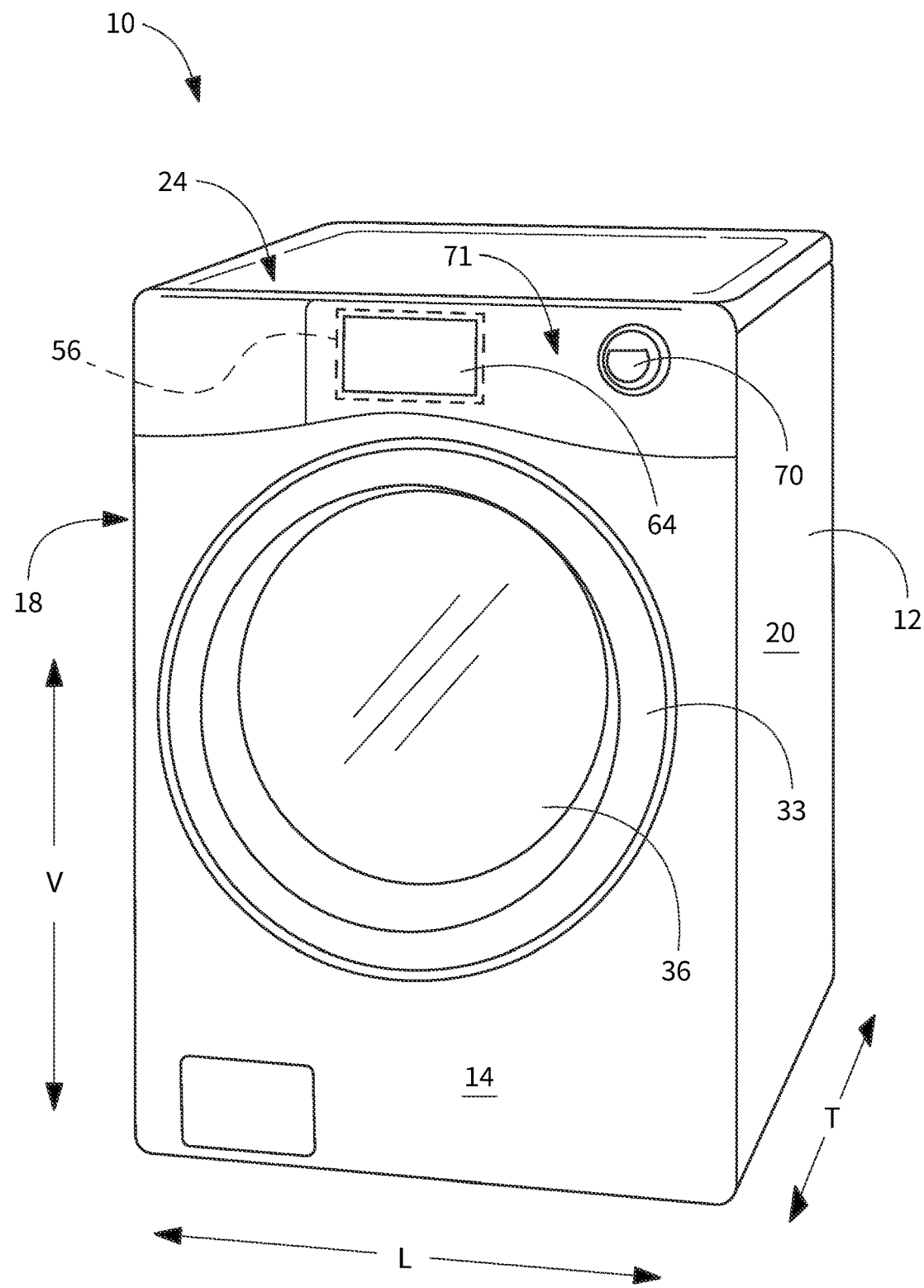
FIG. 1 provides a perspective view of a laundry appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "substantially," "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "articles," "clothing," or "laundry" include but need not be limited to fabrics, textiles, garments, linens, papers, or other items which may be cleaned, dried, and/or otherwise treated in a laundry appliance. Furthermore, the term "load" or "laundry load" refers to the combination of clothing that may be washed together in a washing machine appliance or dried together in a dryer appliance (e.g., clothes dryer), including washed and dried together in a combination laundry appliance, and may include a mixture of different or similar articles of clothing of different or similar types and kinds of fabrics, textiles, garments and linens within a particular laundering process.

Figure 2:
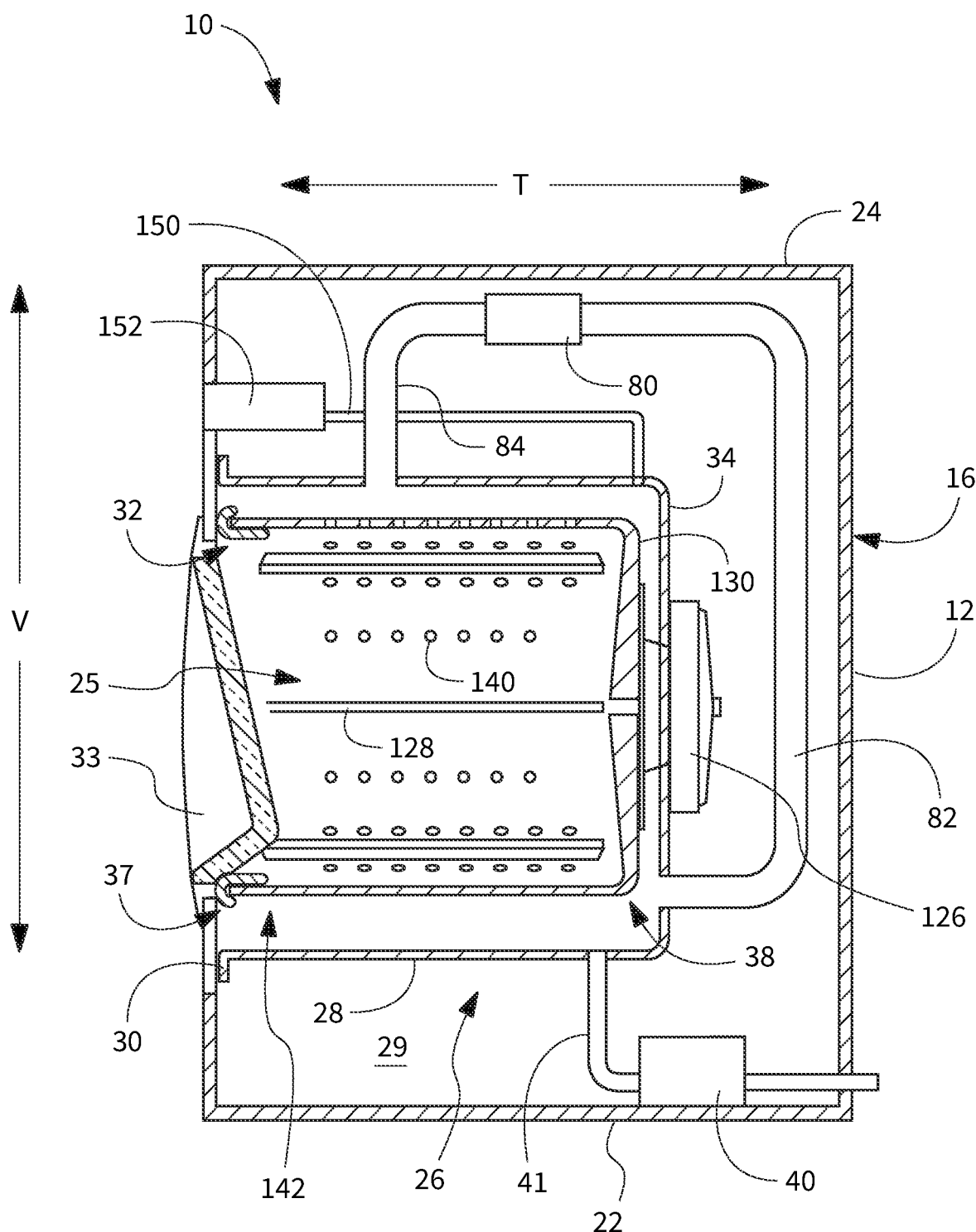
FIG. 2 provides a schematic cross-section view of the example laundry appliance of FIG. 1.
Figure 3:
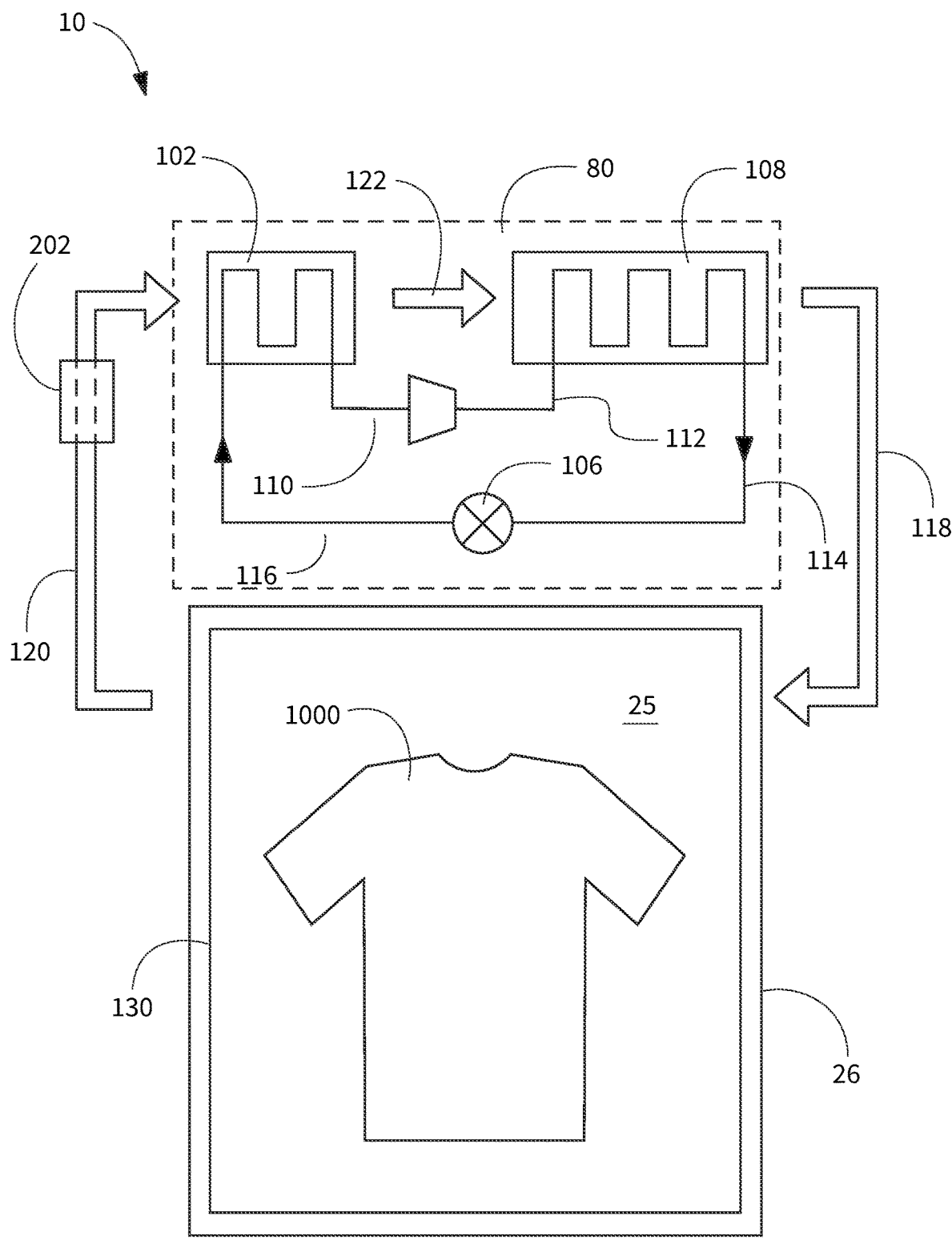
FIG. 3 provides a schematic diagram of an exemplary heat exchange heating system of the example laundry appliance of FIG. 1 according to one or more embodiments of the present disclosure.
Figure 4:
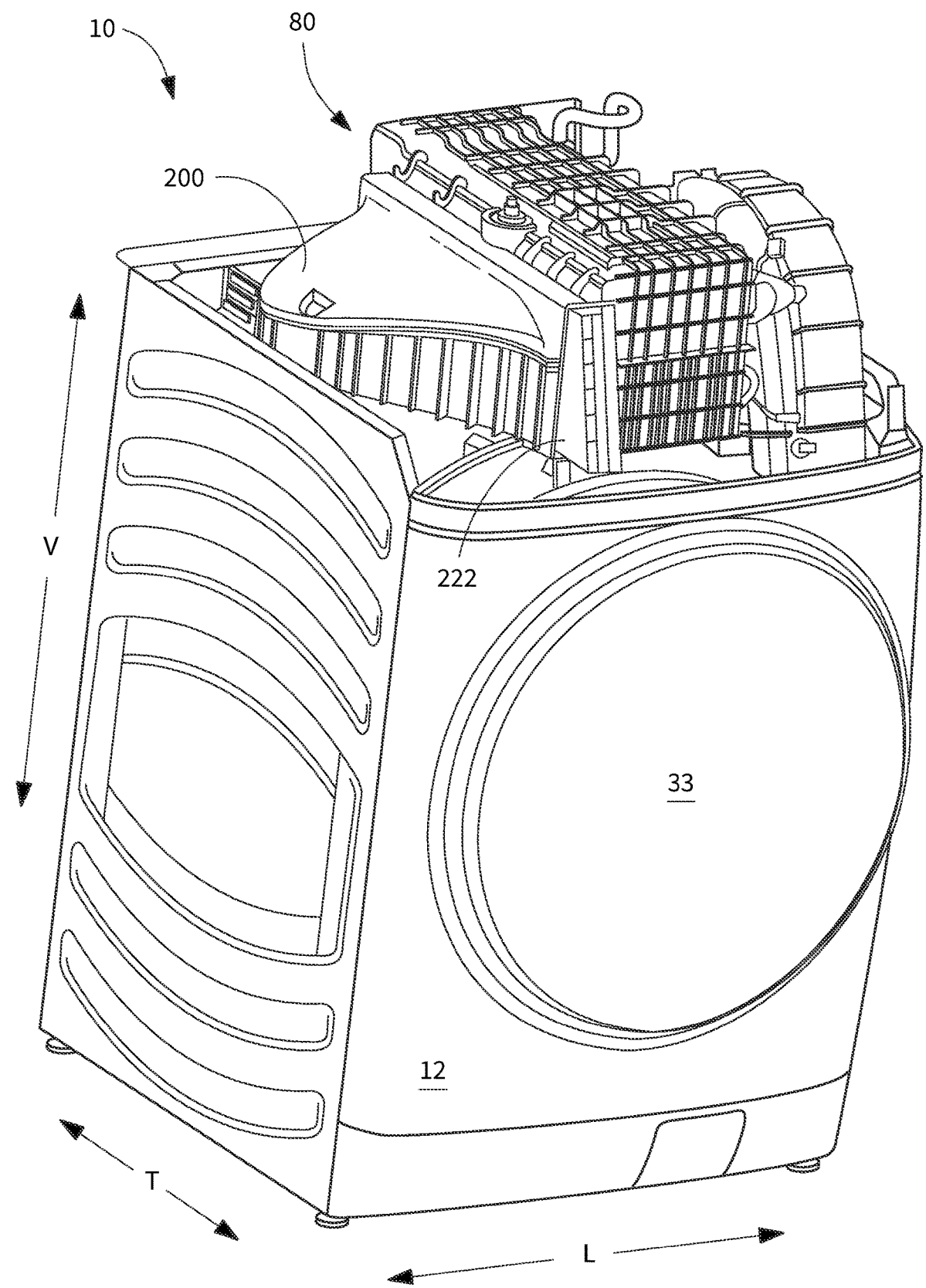
FIG. 4 provides a perspective view of the laundry appliance of FIG. 1 with a portion of a cabinet thereof removed to show internal components of the laundry appliance in accordance with one or more exemplary embodiments of the present disclosure.
Figure 5:
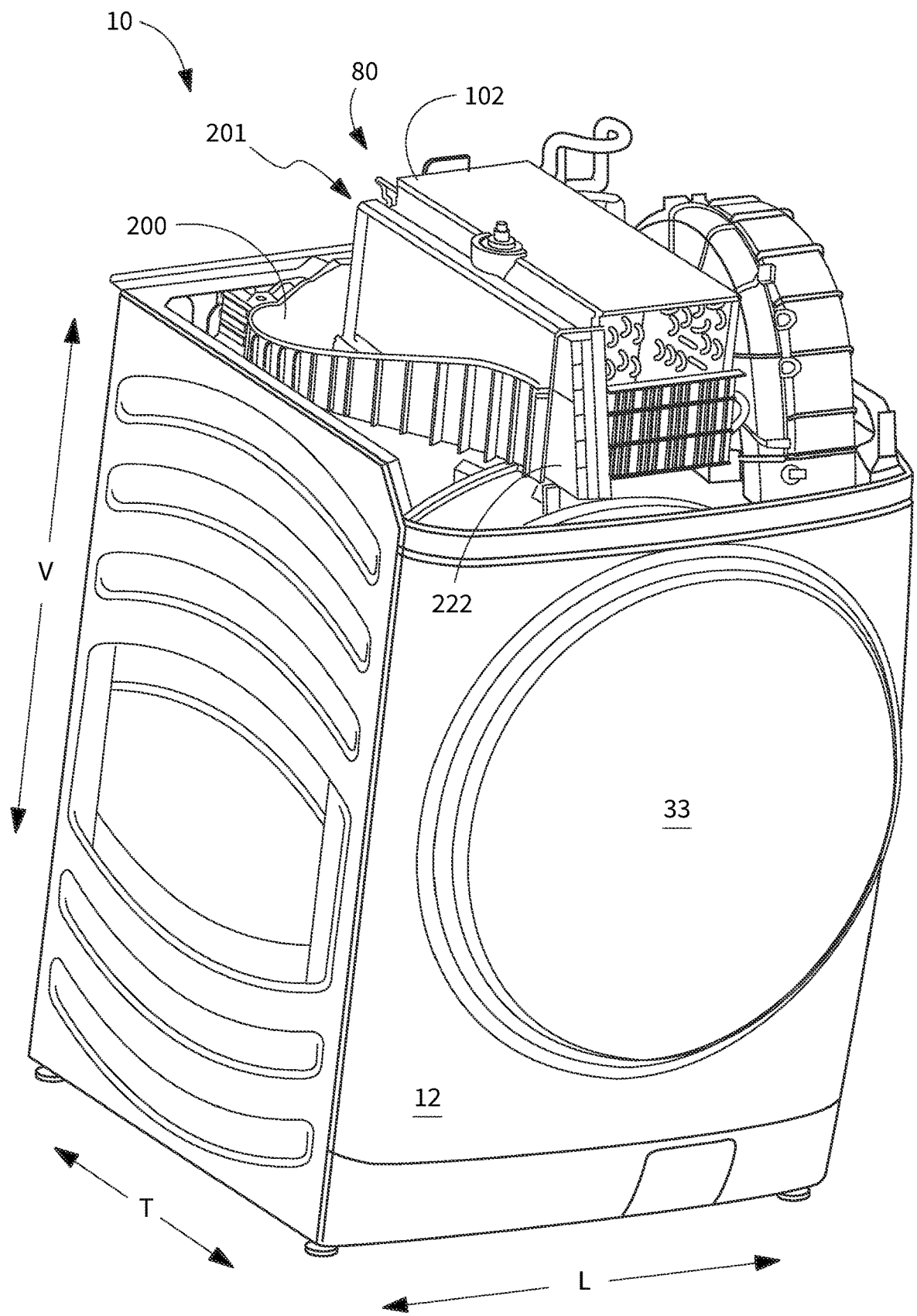
FIG. 5 provides another perspective view of the laundry appliance of FIG. 1 with an upper portion of a housing removed to show an air filter assembly and a heating system therein in accordance with one or more exemplary embodiments of the present disclosure.

Embodiments of the present disclosure include a laundry appliance, e.g., a combination washer-dryer appliance, such as the example combination appliance 10 illustrated in FIGS. 1 through 5. FIG. 1 provides a perspective view of a laundry appliance 10 according to exemplary embodiments of the present disclosure. The laundry appliance 10 is a combination laundry appliance, and may also be referred to as a multifunction laundry appliance or washer/dryer combination appliance. FIG. 2 provides a section view of laundry appliance 10. FIG. 3 provides a schematic illustration of a heat pump heating system which may be incorporated into the laundry appliance 10. FIGS. 4 and 5 provide additional perspective views of the laundry appliance 10. The laundry appliance 10 generally defines a vertical direction V, a lateral direction L, and a transverse direction T, each of which is mutually perpendicular, such that an orthogonal coordinate system is defined. While described in the context of a specific embodiment of laundry appliance 10, using the teachings disclosed herein, it will be understood that laundry appliance 10 is provided by way of example only. Other laundry appliances having different appearances and different features may also be utilized with the present subject matter as well.

Cabinet 12 includes a front panel 14, a rear panel 16, a left side panel 18 and a right side panel 20 spaced apart from each other by front and rear panels 14 and 16, a bottom panel 22, and a top cover 24. As used herein, terms such as "left" and "right" or "front" and "back" refer to directions from the perspective of a user facing the laundry appliance 10 for accessing and/or operating the laundry appliance 10. For example, a user stands in front of the laundry appliance 10, e.g., at or near the front panel 14, to access door 33 and/or inputs 70 (the door 33 and inputs 70 are described in more detail below). Within cabinet 12, an interior volume 29 is defined. A drum or tub 26 is mounted within the interior volume 29. A laundry basket 130 is mounted within the tub 26. The laundry basket 130 defines a chamber 25 for receipt of articles of clothing for treatment, e.g., washing, rinsing, spinning, tumbling, and/or drying.

In some embodiments, one or more selector inputs 70, such as knobs, buttons, touchscreen interfaces, etc., may be provided or mounted on the cabinet 12, e.g., on a control panel 71 thereof and are in operable communication (e.g., electrically coupled or coupled through a wireless network band) with a processing device or controller 56. The control panel 71 may also include a display 64. Controller 56 may also be provided in operable communication with various components of the laundry appliance, such as the motor, blower, and/or heating system 80. In turn, signals generated in controller 56 direct operation of such components in response to the position of inputs 70. As used herein, "processing device" or "controller" may refer to one or more microprocessors, microcontroller, ASICS, or semiconductor devices and is not restricted necessarily to a single element. The controller 56 may be programmed to operate laundry appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Tub 26 extends between a front portion 37 and a back portion 38. Tub 26 is generally cylindrical in shape, having an outer cylindrical wall 28 and a front flange or wall 30 that defines an opening 32 of tub 26, e.g., at front portion 37 of tub 26, for loading and unloading of articles into and out of a chamber 25 defined by and within a laundry basket 130 inside of the tub 26. Tub 26 includes a rear wall 34 opposite the front flange 30. A door 33 provides for closing or accessing tub 26 through opening 32. A window 36 (FIG. 1) may be provided in door 33 for viewing of the chamber 25 and/or laundry articles therein, e.g., during operation of the laundry appliance 10.

Laundry basket 130 is rotatably mounted within tub 26 such that the laundry basket 130 is rotatable about an axis of rotation. According to the illustrated embodiment, the axis of rotation is substantially parallel to the transverse direction T. In this regard, laundry appliance 10 is generally referred to as a "horizontal axis" or "front load" laundry appliance 10. However, it should be appreciated that aspects of the present subject matter may be used within the context of a vertical axis or top load laundry appliance as well.

Laundry appliance 10 includes a motor assembly 126 that is in mechanical communication with laundry basket 130 to selectively rotate laundry basket 130. The motor assembly 126 may be a pancake motor, as illustrated, or any other suitable type, size, or configuration of motor may be used to rotate laundry basket 130 according to various embodiments. For example, a motor, such as a brushless DC motor, may be mounted within the cabinet 12 and the motor may be coupled to the laundry basket 130 by a belt and pulley, whereby the motor rotates the laundry basket 130 through the belt and pulley.

Laundry basket 130 may define one or more agitator features that extend into chamber 25 to assist in agitation and cleaning of articles disposed within laundry chamber 25 during operation of laundry appliance 10. For example, as illustrated in FIG. 2, a plurality of ribs 128 extends from laundry basket 130 into chamber 25. In this manner, for example, ribs 128 may lift articles disposed in laundry basket 130 during rotation of laundry basket 130, such as during an agitation or rinse portion of a wash operation of the laundry appliance 10. During a drying operation of the laundry appliance 10, the ribs 128 may also lift articles in the chamber 25 of the laundry basket 130 and then allow such articles to tumble back to a bottom of laundry basket 130 as laundry basket 130 rotates.

As illustrated for example in FIG. 2, laundry basket 130 may also include a plurality of perforations 140 extending therethrough in order to facilitate fluid communication between chamber 25 and tub 26, e.g., whereby wash liquid may flow between the tub 26 and the chamber 25 during a wash operation or cycle and/or heated air may flow into the chamber 25 and moisture-laden air may flow out of the chamber 25 during a drying operation or cycle. A sump 142 is defined by tub 26 outside of laundry basket 130 at a bottom of the tub 26 along the vertical direction V. Thus, sump 142 is configured for receipt of, and generally collects, wash liquid (the wash liquid may include, e.g., water, and may also includes additives such as detergents, etc.) during wash operations of laundry appliance 10. For example, during a wash operation of laundry appliance 10, wash liquid may be urged (e.g., by gravity) from the chamber 25 within the laundry basket 130 to sump 142 through the plurality of perforations 140. A pump assembly 40 is located beneath tub 26 for gravity assisted flow when draining tub 26 (e.g., via a drain 41). Pump assembly 40 is also configured for recirculating wash liquid within tub 26.

In some embodiments, laundry appliance 10 includes an additive dispenser or spout 150. For example, spout 150 may be in fluid communication with a water supply (not shown) in order to direct fluid (e.g., clean water) into tub 26. Spout 150 may also be in fluid communication with the sump 142. For example, pump assembly 40 may direct wash liquid disposed in sump 142 to spout 150 in order to circulate wash liquid in tub 26.

As illustrated, a detergent dispenser drawer 152 may be slidably mounted within front panel 14. Detergent dispenser drawer 152 receives an additive (e.g., detergent, fabric softener, bleach, or any other suitable liquid or powder) and directs the additive to chamber 25 during operation of laundry appliance 10. According to the illustrated embodiment, detergent dispenser drawer 152 may also be fluidly coupled to spout 150 to facilitate the complete and accurate dispensing of the additive.

In exemplary embodiments, during operation of laundry appliance 10, laundry items are loaded into laundry basket 130 through opening 32, and an operation is initiated through operator manipulation of input selectors 70. For example, a wash cycle may be initiated such that tub 26 is filled with water, detergent, or other fluid additives (e.g., via spout 150). One or more water valves (not shown) can be controlled by laundry appliance 10 to provide for filling laundry basket 130 to the appropriate level for the amount of articles being washed or rinsed. By way of example, once laundry basket 130 is properly filled with fluid, the contents of laundry basket 130 can be agitated (e.g., with ribs 128) for an agitation phase of laundry items in laundry basket 130. During the agitation phase, the basket 130 may be motivated about the axis of rotation at a set speed (e.g., a tumble speed) by a motor. As the basket 130 is rotated, articles within the basket 130 may be lifted by ribs 128 and permitted to drop therein due to gravity.

After the agitation phase of the washing operation is completed, tub 26 can be drained. Laundry articles can then be rinsed (e.g., through a rinse cycle) by again adding fluid to tub 26, depending on the particulars of the cleaning cycle selected by a user. Ribs 128 may again provide agitation within laundry basket 130. One or more spin cycles may also be used. In particular, a spin cycle may be applied after the wash cycle or after the rinse cycle in order to wring wash liquid from the articles being washed. During a spin cycle, basket 130 is rotated at relatively high speeds. For instance, basket 130 may be rotated at one set speed (e.g., a pre-plaster speed) before being rotated at another set speed (e.g., a plaster speed). As would be understood by those of ordinary skill in the art, the pre-plaster speed may be greater than the tumble speed and the plaster speed may be greater than the pre-plaster speed. Moreover, agitation or tumbling of articles may be reduced as basket 130 increases its rotational velocity such that the plaster speed maintains the articles at a generally fixed position relative to basket 130.

After the spin cycle, a drying operation may begin. A supply duct 82 may be mounted to tub 26 and may extend between tub 26 and a heating assembly or system 80, whereby the tub 26 is downstream of the heating system 80 along the supply duct 82 such that the heating system 80 supplies heated air that has been heated by the heating system 80 to the tub 26 via the supply duct 82. A return duct 84 may also be mounted to the tub 26 and may extend between tub 26 and the heating system 80 whereby the tub 26 is upstream of the heating system 80 along the return duct 84 such that the heating system 80 receives relatively warm and humid air from the tub 26 via the return duct 84, e.g., air returns to the heating system 80 from the tub 26, e.g., after flowing over and around articles within the chamber 25, through the return duct 84. In some embodiments, e.g., as illustrated in FIGS. 2 and 3, the heating system 80 may be positioned above the tub 26 and the return duct 84 may be oriented generally along the vertical direction V, and the return duct 84 may also be referred to as a chimney. The supply duct 82 may be mounted to the tub 26, e.g., at the rear wall 34 thereof as in the illustrated example, or the supply duct 82 may be mounted to the cylindrical wall 28 of the tub 26, such as above the basket 130, similar to the return duct 84 in the illustrated example embodiment.

The heating system 80, may include, e.g., a resistance heating element, a gas burner, and/or a heat pump, such as the example heat pump embodiment illustrated in FIG. 3 and described in more detail below, or any other suitable heat source. Moisture-laden, warm air is drawn from tub 26 by an air handler, such as a blower fan, which generates a negative air pressure within the chamber 25. As the air passes from the blower fan, it enters return duct 84 and then is passed into heating system 80. Heated air (with a lower moisture content than was received from tub 26), exits heating system 80 and is supplied to tub 26 by supply duct 82. After the clothing articles have been dried, they are removed from the chamber 25 via opening 32.

Turning now to FIG. 3, a schematic view of selected components of one or more exemplary embodiments of laundry appliance 10 is provided. In particular, FIG. 3 illustrates components used during drying operations of the laundry appliance 10. It is understood that, except as otherwise indicated, laundry appliance 10 in FIG. 3 may include some or all of the features described herein with respect to FIGS. 1, 2, 4, and 5.

In operation, one or more laundry articles 1000 may be placed within the chamber 25 of laundry basket 130. Hot dry air 118 may be supplied to chamber 25 whereby moisture within laundry articles 1000 may be drawn from the laundry articles 1000 by evaporation, such that warm saturated air 120 may flow from chamber 25 to an evaporator 102 of the heating system 80, e.g., via the return duct 84 illustrated in FIG. 2. As air passes across evaporator 102, the temperature of the air is reduced through heat exchange with refrigerant that is vaporized within, for example, coils or tubing of evaporator 102. This vaporization process absorbs both the sensible and the latent heat from the moisture-laden air-thereby reducing its temperature. As a result, moisture in the air is condensed and such condensate may be drained from heating assembly 80, as will be understood by those of ordinary skill in the art.

Air passing over evaporator 102 becomes drier and cooler than when it was received from tub 26 of laundry appliance 10. As shown, cool dry air 122 from evaporator 102 is subsequently caused to flow across a condenser 108 (e.g., across coils or tubing of the condenser 108), which condenses refrigerant therein. The refrigerant enters condenser 108 in a gaseous state at a relatively high temperature and pressure compared to the cool, dry air 122 from evaporator 102. As a result, heat energy is transferred to the air at the condenser section 108, thereby elevating the temperature of the air and providing hot dry air 118 for supply to the tub 26 of laundry appliance 10, e.g., via the supply duct 82 illustrated in FIG. 2. The hot dry air 118 passes over and around laundry articles 1000 within the chamber 25 inside of the tub 26, such that warm saturated air 120 is generated, as mentioned above. For example, the hot dry air may circulate around and through the articles 1000 while the articles 1000 are tumbled within the chamber 25 such as by rotating the basket 130, and the tumbling may be promoted by ribs 128 as well. Because the air is recycled through tub 26 and heating system 80, e.g., in a closed-loop as mentioned above, laundry appliance 10 can have a much greater efficiency than traditional clothes dryers where warm, moisture-laden air is exhausted to the environment.

As shown in FIG. 3, some embodiments of heating system 80 include a compressor 104 that pressurizes refrigerant (i.e., increases the pressure of the refrigerant) supplied by a suction line 110 and generally motivates refrigerant through the sealed refrigerant circuit of heating system 80. Compressor 104 may be in operable communication with controller 56 and is generally designed to pressurize a gas phase refrigerant. Accordingly, in order to avoid damage, refrigerant in suction line 110 is supplied to the compressor 104 in a gas phase from the evaporator section 102. The pressurization of the refrigerant with compressor 104 increases the temperature of the refrigerant (e.g., as directed by controller 56). The compressed refrigerant is fed from compressor 104 to condenser 108 through line 112. As relatively cool air 122 from the evaporator 102 is passed over the condenser 108, the refrigerant is cooled and its temperature is lowered as heat is transferred to the air for supply to tub 26.

Upon exiting condenser 108, the refrigerant is fed through line 114 to an expansion device 106. Although only one expansion device 106 is shown, such is by way of example only. It is understood that multiple such devices may be used. In the illustrated example, expansion device 106 is a thermal expansion valve. In additional embodiments, any other suitable expansion device, such as a capillary tube, may be used as well as or instead of the thermal expansion valve 106. Expansion device 106 lowers the pressure of the refrigerant and controls the amount of refrigerant that is allowed to enter the evaporator 102 via line 116. Importantly, the flow of liquid refrigerant into evaporator 102 is limited by expansion device 106 in order to keep the pressure low and allow expansion of the refrigerant back into the gas phase in the evaporator 102. The evaporation of the refrigerant in the evaporator 102 converts the refrigerant from its liquid-dominated phase to a gas phase while cooling and drying the air 120 from tub 26. The process is repeated as air is circulated through tub 26 and between evaporator 102 and condenser 108 while the refrigerant is cycled through the sealed refrigerant circuit, as described above.

The laundry appliance 10 may include an air filter 202, e.g., positioned between the tub 26 and the heating system 80 with the air filter 202 downstream of the tub 26, e.g., downstream of the chamber 25 of the basket 130 in the tub 26, and upstream of the heating system 80, whereby air flowing from the chamber 25 passes through and is filtered by the air filter 202 before flowing to the heating system 80.

As mentioned, the air filter 202 filters the air, e.g., the air filter 202 may remove particles such as lint particles from the air, as well as dust, hair, or other airborne matter, as will be understood by those of ordinary skill in the art. Accordingly, such particles may accumulate on and in the air filter 202, and in particular on an outer surface or upstream surface of the air filter 202, over time. If left unchecked, such accumulated particles may eventually obstruct air flow through the filter 202, resulting in reduced efficiency or performance of the air filter 202 and/or the laundry appliance 10, such as the heating system 80 of the laundry appliance 80. Thus, the air filter 202 may be user accessible, e.g., to permit a user to clean the air filter 202.

FIG. 4 provides a perspective view of laundry appliance 10 with a portion, e.g., an upper portion such as top cover 24, of the cabinet 12 thereof removed to reveal internal components of the laundry appliance 10. The laundry appliance 10 may include a heating system 80, e.g., as described above. As illustrated in FIG. 4, the heating system 80 is enclosed within a housing 200. The heating system 80 may be seen in FIG. 5, where an upper portion, e.g., upper half, of the housing 200 is also removed, e.g., in addition to the portion of the cabinet 12. The heating system 80 may include a heat exchanger, e.g., evaporator 102 (see, e.g., FIG. 3) and an air filter 202 may be positioned between the laundry basket 130 and the heating system 80. The air filter 202 may be a part of an air filter assembly 201. For example, the air filter 202 may be positioned upstream of the heating system 80, such as upstream of the evaporator 102 of the heating system 80, e.g., where the evaporator 102 is the furthest upstream portion or component of the heating system 80, e.g., the first component of the heating system 80 to receive a flow of warm, moist air from the chamber 25. With the air filter 202 so positioned, a flow of return air 120 (FIG. 3) from the chamber 25 may pass through and may be filtered by the air filter 202 before flowing to the heating system 80. For example, the air filter 202 may include a porous or air-permeable material which permits air to flow therethrough while trapping particles above a specified size therein. The air filter 202 and/or air filter assembly 201 may be removable from the housing 200.

Figure 6:
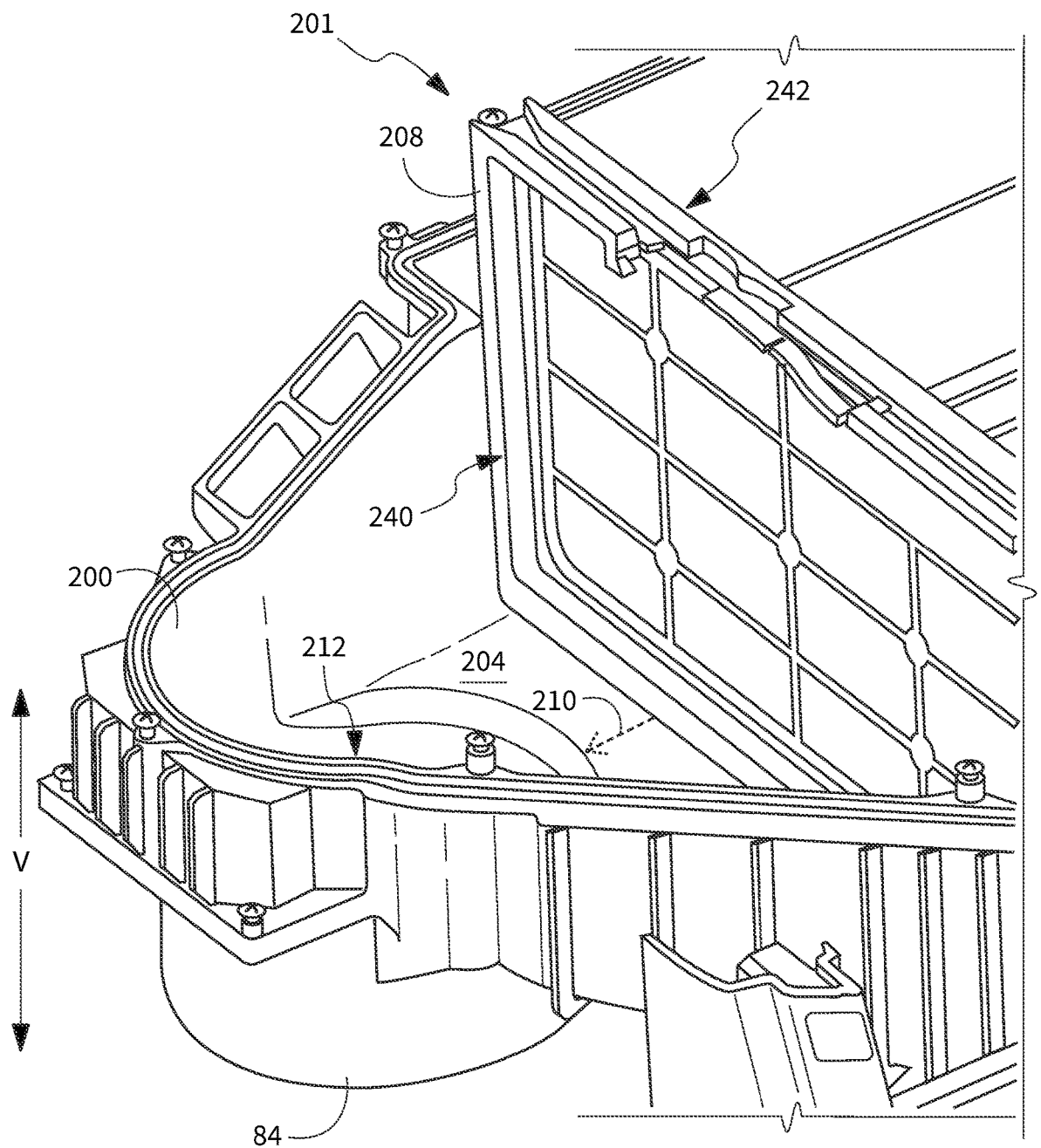
FIG. 6 provides a perspective view of a portion of the housing, the air filter assembly, and the heating system of FIG. 5.

FIG. 6 provides a perspective view of a lower portion, e.g., lower half, of the housing 200 (e.g., the upper portion of the housing is removed in FIG. 6 in order to depict internal structures of the housing 200 and to depict the air filter assembly 201 in the inserted position in the housing 200). As illustrated in FIG. 6, the air filter 202 may be part of the air filter assembly 201. The air filter assembly 201 may include an outer shell 208 which interfaces with the housing 200 and a frame 206 mounted in the shell 208. The air filter assembly 201 may also include a handle 222 (FIG. 5), e.g., on an outer end of the shell 208, such as may be grasped by a user to extract the air filter assembly 201 from the housing 200. The air filter 202 (FIG. 11) may be mounted to the frame 206. For example, the frame 206 may be releasably mounted in the shell 208 and/or the filter 202 may be releasably mounted to the frame 206, such as to remove the filter 202 and/or frame 206 for cleaning, e.g., to remove accumulated dust, lint, and/or other similar particles which may become entrapped in or on the air filter 202 over time after use. For example, the air filter 202 may be removed from the air filter assembly 201, e.g., after taking the air filter assembly 201 out of the housing 200.

As may be seen in FIG. 6, the housing 200 may include a floor 204. The floor 204 may be pitched or sloped, such as pitched towards an outlet 212 of the return duct 84. The pitch of the floor 204 may define or partially define a drain path 210 that extends through the housing 200, such as at least partially through the housing 200, such as from downstream of the air filter 202 and/or air filter assembly 201 to the outlet 212 of the return duct 84, where "downstream" of the air filter assembly 201 refers to the flow direction of air returning to the heating system 80 from the chamber 25, e.g., such that the drain path 210 for liquid from the housing 200 may be generally opposite the direction of air flow. Thus, for example, moisture which enters the housing 200 or which otherwise accumulates within the housing 200, such as accumulates downstream of the air filter assembly 201, may be directed away from the heating assembly 80, e.g., to or towards the return duct 84, such as to permit the moisture to flow to the sump 142 (FIG. 2).

Figure 7:
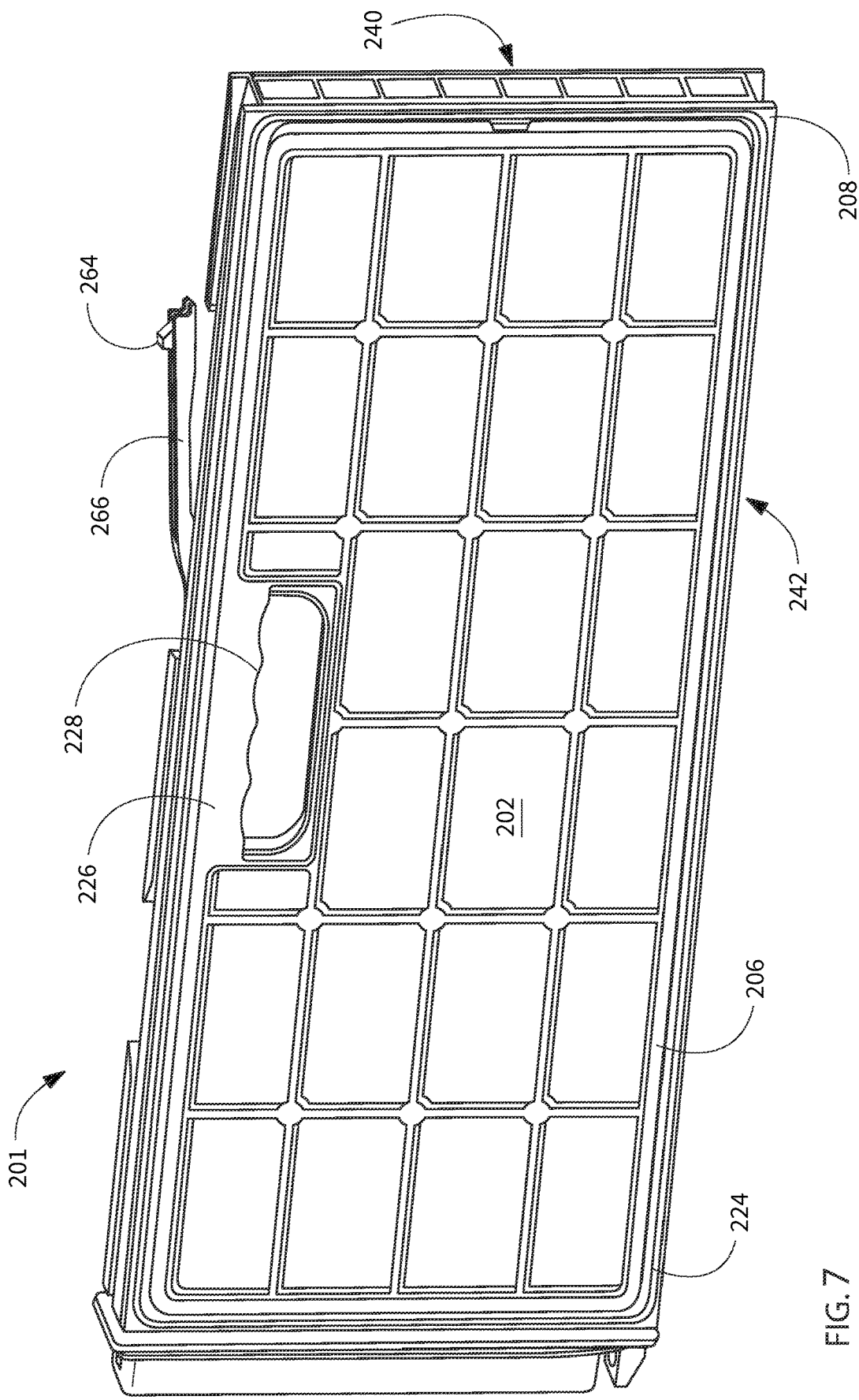
FIG. 7 provides a perspective view of the filter assembly of FIG. 5.

Also as may be seen in FIGS. 6 and 7, the air filter 202 and/or air filter assembly 201 may include an upstream side 240 and a downstream side 242, e.g., with respect to the flow of return air 120 from the chamber 25 to the heating assembly 80. For example, the downstream side 242 of the air filter 202 and/or air filter assembly 201 may be proximate to and face towards the heating system 80, whereas the upstream side 240 may be opposite the downstream side 242, e.g., the upstream side may be the farthest side of the air filter assembly 201 from the heating system 80 and may face away from the heating system 80, such as towards the outlet 212 of the return duct 84. In such embodiments, the drain path 210 may extend between the upstream side 240 of the air filter 202 and the downstream side 242 of the air filter 202, such as from the downstream side 242 to the upstream side 240 and/or to other components upstream of the air filter 202, e.g., to the return duct 84 and/or the outlet 212 thereof.

FIG. 7 provides a perspective view of an exemplary air filter assembly 201 according to one or more embodiments of the present disclosure. As illustrated in FIG. 7, the air filter assembly 201 may include an outer shell 208 which interfaces with the housing 200 and a frame 206 mounted in the shell 208. The air filter assembly 201 may also include a handle 222 (FIGS. 4 and 5), e.g., on an outer end of the shell 208, such as may be grasped by a user to extract the air filter assembly 201 from the housing 200. The air filter 202 may be mounted to the frame 206. For example, the frame 206 may be releasably mounted in the shell 208 and/or the filter 202 may be releasably mounted to the frame 206, such as to remove the filter 202 and/or frame 206 for cleaning, e.g., to remove accumulated dust, lint, and/or other similar particles which may become entrapped in or on the air filter 202 over time after use. For example, the air filter 202 may be removed from the air filter assembly 201, e.g., after taking the air filter assembly 201 out of the housing 200.

In some embodiments, e.g., as illustrated in FIG. 7, the air filter assembly 201 may also include a latch 264. For example, the latch 264 may be mounted on, such as integrally joined to, a cantilevered arm 266. In some embodiments, the cantilevered arm 266 may be joined to the shell 208 of the air filter assembly 201.

Also as may be seen in FIG. 7, the air filter assembly 201 may further include a gasket 224, e.g., on the shell 208 and surrounding the air filter 202. The air filter 202 and/or air filter assembly 210 may include an upstream side 240 and a downstream side 242, e.g., with respect to the flow of return air from the chamber 25 to the heating assembly 80. For example, the downstream side 242 of the air filter 202 and/or air filter assembly 201 may be proximate to and face towards the heating system 80, whereas the upstream side may be opposite the downstream side 242, e.g., the upstream side may be the farthest side of the air filter assembly 201 from the heating system 80 and may face away from the heating system 80, such as towards the return duct 84. For example, the gasket 224 may be disposed on the downstream side 242 of the air filter assembly 201, e.g., whereby the gasket 224 sealingly engages the heating system 80 when the air filter assembly 201 is in an installed position within the housing 200.

Figure 8:
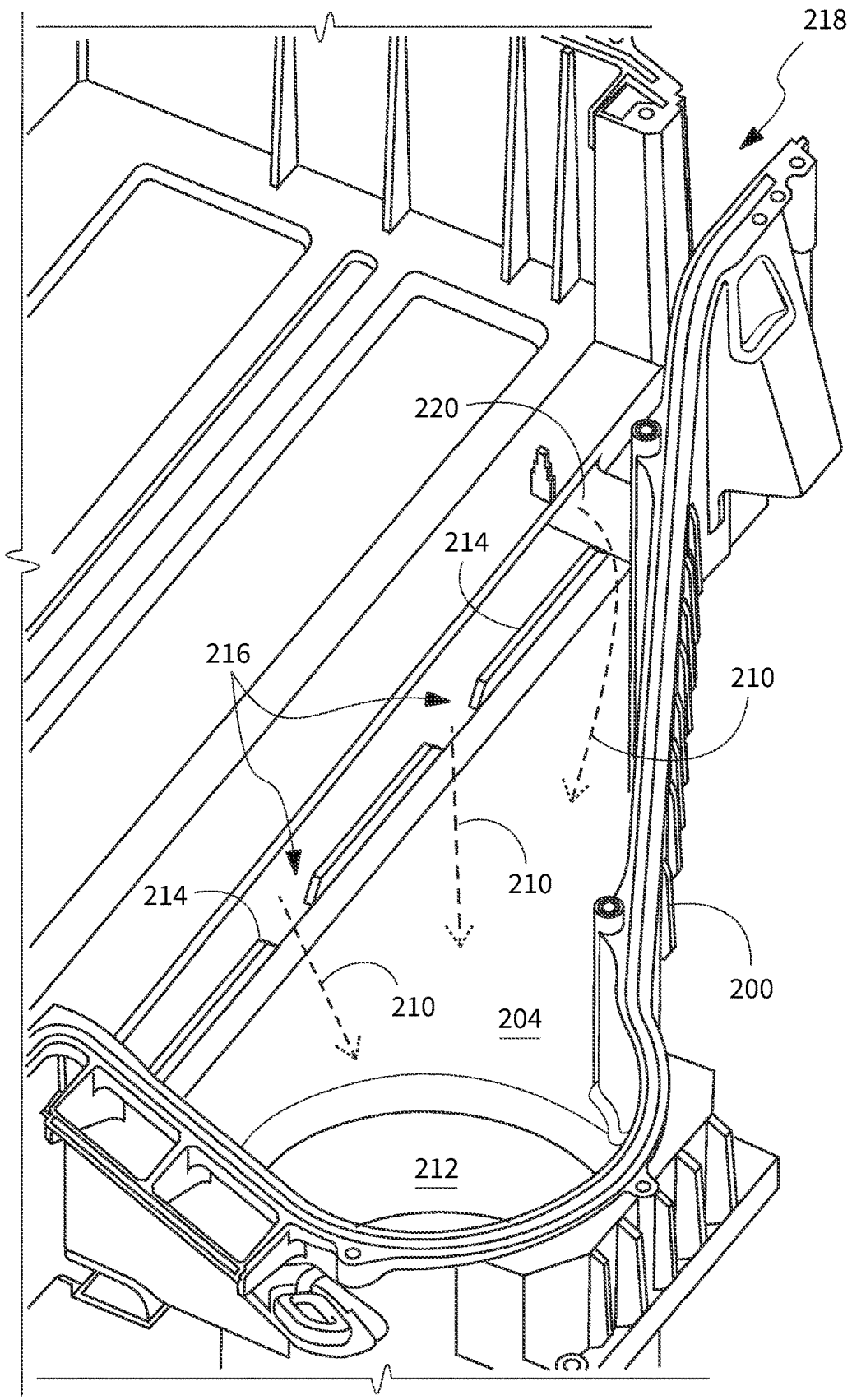
FIG. 8 provides another perspective view of a portion of the housing of FIG. 5.
Figure 9:
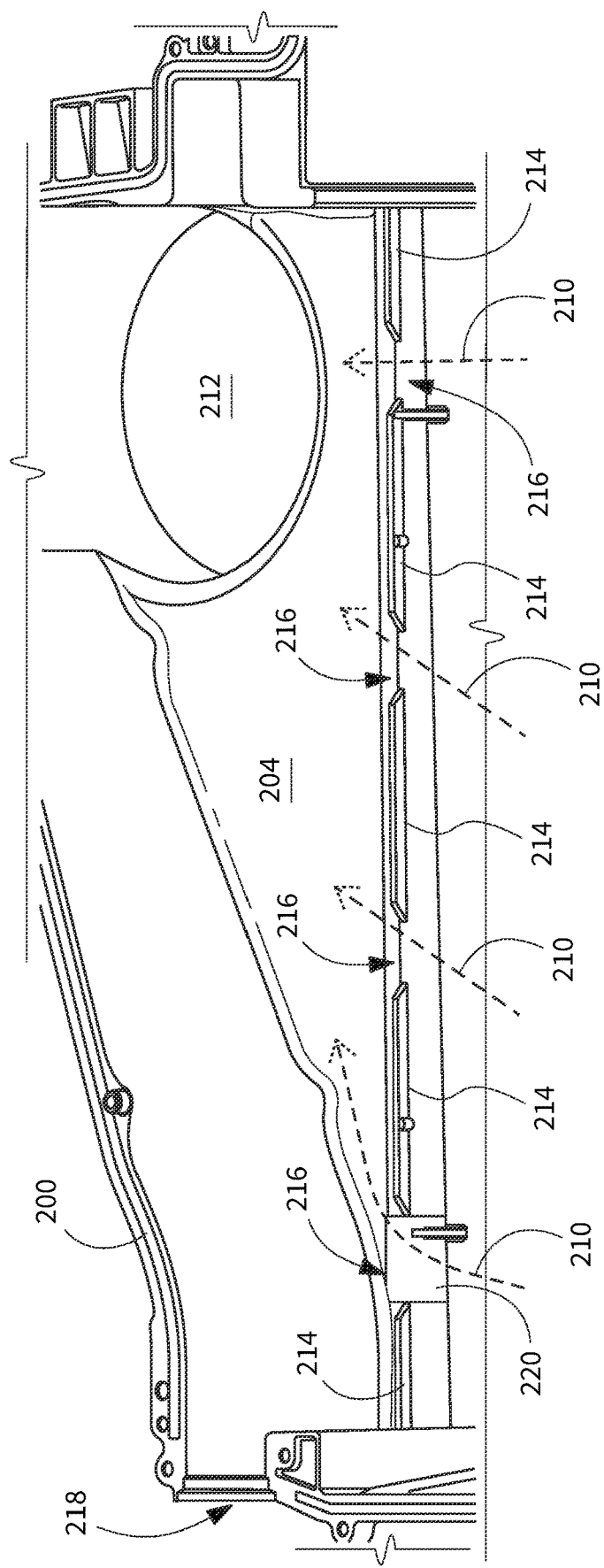
FIG. 9 provides another perspective view of a portion of the housing of FIG. 5.

In some embodiments, such as the example embodiments illustrated in FIGS. 8 and 9, the drain path 210 may be a divided drain path, whereby accumulated moisture may travel across one or more branches of the drain path 210 before ultimately ending up at the end point of the drain path 210, e.g., at the outlet 212 of the return duct 84 from which air flows into the housing 200 (the terms "outlet" and "into" are used with respect to the air flow direction, as mentioned above with respect to "downstream" of the air filter). For example, as may be seen in FIGS. 8 and 9, the housing 200 may include a guide rail 214 and the guide rail 214 may be discontinuous, e.g., one or more gaps 216 may be formed in the guide rail 214. Where more than one gap 216 is provided in the guide rail 214, each gap 216 may permit moisture to flow therethrough, thus the gap 216 or each gap 216 may define a portion of the drain path 210, such as a branch of the drain path 210 in embodiments where the drain path 210 is a divided drain path.

Figure 10:
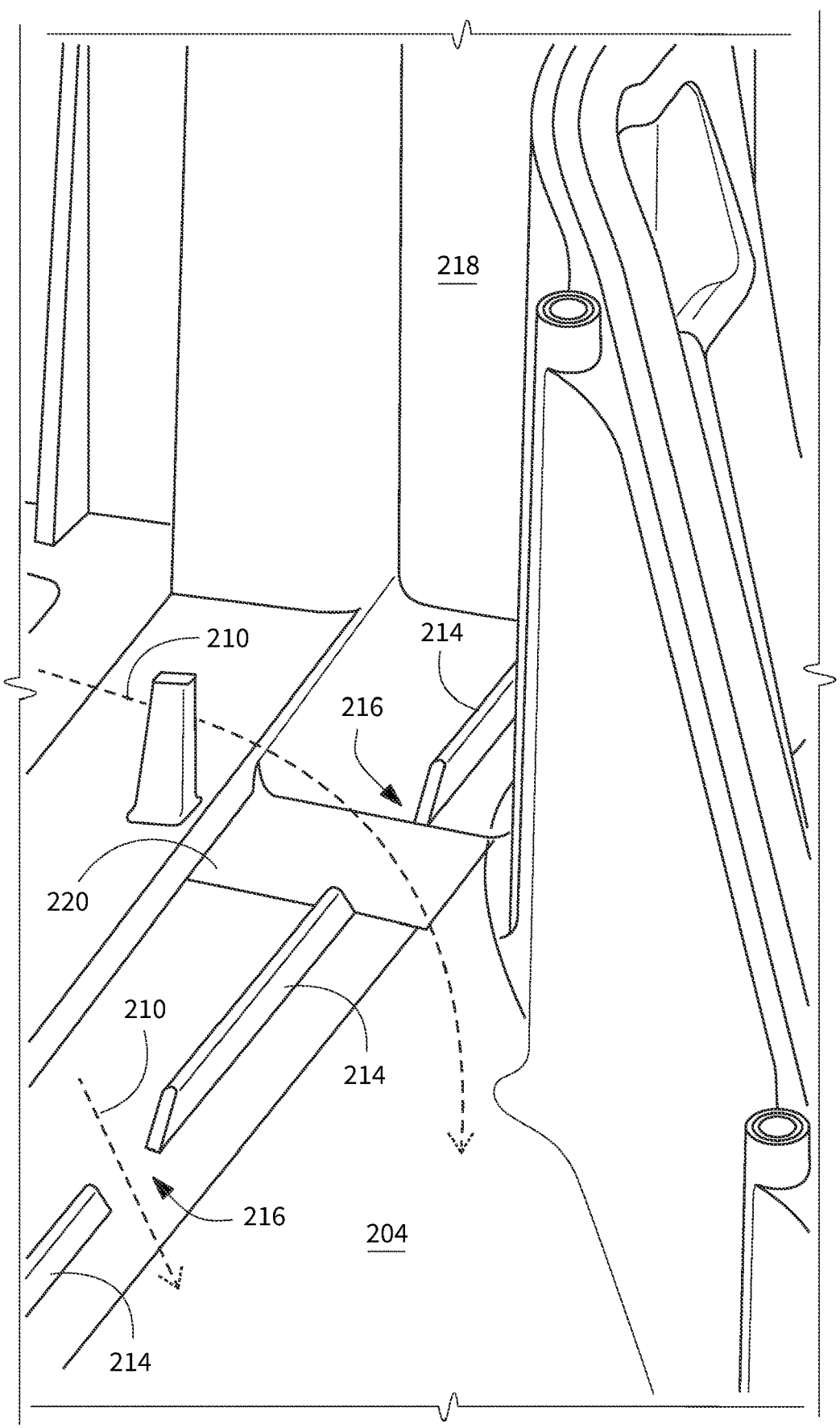
FIG. 10 provides an enlarged perspective view of a portion of the housing of FIG. 5.

As mentioned, the air filter 202 and/or air filter assembly 201 may be removably positioned in the housing 200. In such embodiments, the air filter 202 and/or air filter assembly 201 may be configured to translate in a travel direction along the guide rail 214 between an inserted position in the housing 200 (see, e.g., FIGS. 4 through 6), and an extracted position at least partially outside of the housing 200, such as where the air filter 202 and/or air filter assembly 201 may be entirely outside of the housing 200, e.g., as illustrated in FIGS. 8 through 10. For example, the housing 200 may include a filter gate 218 through which the air filter assembly 201 may be inserted into and/or removed from the housing 200. In embodiments where the guide rail 214 is discontinuous, the guide rail 214 may be discontinuous along the travel direction, e.g., the guide rail 214 may be oriented generally along the travel direction and the discontinuities, e.g., gaps 216, may also be oriented generally along and/or generally parallel to the travel direction.

In some embodiments, e.g., as illustrated in FIGS. 8 through 10, the housing 200 may include a water channel 220, e.g., defined in the floor 204 of the housing 200. In such embodiments, the water channel 220 may define at least a portion of the drain path 210. For example, in some embodiments, e.g., as may be seen in FIGS. 8 through 10, the water channel 220 may coincide with or be aligned with the gap 216 in the guide rail 214, or one of the gaps 216 in embodiments where multiple gaps 216 are included. In particular, as may be seen in FIGS. 8 through 10, the water channel 220 may be coincident with a gap 216 proximate to the gate 218, such as the gap 216 of the plurality of gaps 216 which is most proximate to the gate 218, e.g., in embodiments where multiple gaps 216 are included. In such embodiments, moisture which is retained in or around, e.g., under, the air filter assembly 201 may be released or permitted to escape via the water channel 220 as the air filter assembly 201 is removed from the housing 200, whereupon the moisture may then continue along the drain path 210, e.g., from the water channel 220 to the outlet 212 of the return duct 84.

Figure 11:
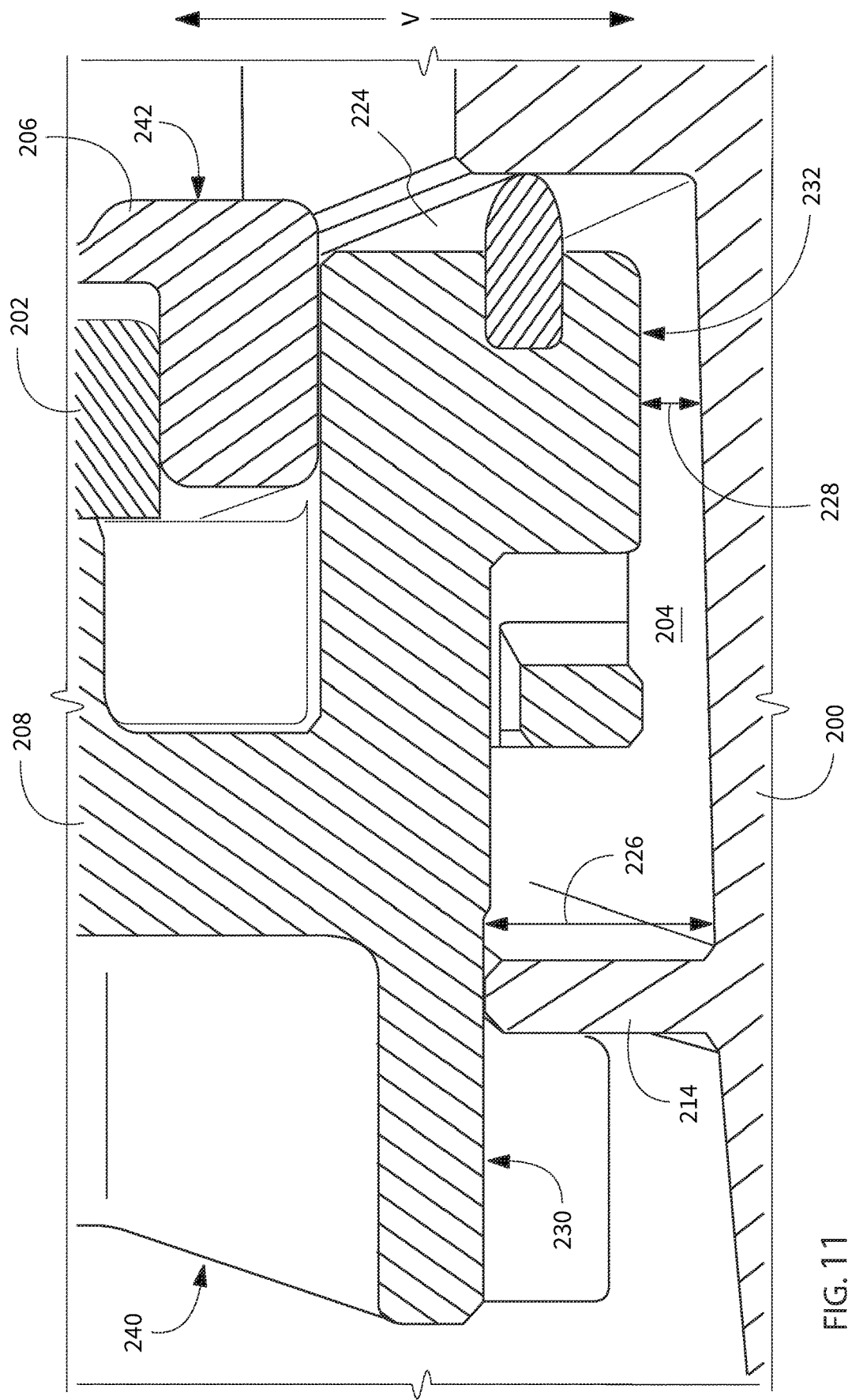
FIG. 11 provides a partially sectioned enlarged perspective view of a portion of the housing and the air filter assembly.

As may be seen in FIG. 11, the air filter assembly 201 includes a guide surface 230, and the guide surface 230 may be oriented downwards along the vertical direction V. When the air filter is in the inserted position and/or a partially inserted position, the guide surface 230 may be in contact with a top of the guide rail 214, e.g., as may be seen in FIG. 11. In such embodiments, the guide rail 214 may define a height 226 above the floor 204 of the housing 200. Also in such embodiments a bottom surface 232, e.g., which may be the lowermost surface of the air filter assembly 201, may be spaced apart from the floor 204 of the housing 200 along the vertical direction V when the air filter assembly 201 is in the inserted position. For example, as illustrated in FIG. 11, a gap 228 may thereby be defined below the air filter assembly 201, and the gap 228 may partially define the flow path 210, e.g., moisture may be permitted to travel along the slope of the floor 204 from the downstream side 242 of the air filter assembly 201 to or towards the upstream side 240 of the air filter assembly 201, such as underneath the air filter assembly 201, through the gap 228.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance, comprising:
    a cabinet defining an interior volume;
    a tub mounted within the interior volume of the cabinet;
    a laundry basket rotatably mounted within the tub, the laundry basket defining a chamber for the receipt of articles for treatment;
    a heating system in thermal communication with the chamber whereby heated air flows from the heating system to the chamber;
    an air filter assembly positioned between the laundry basket and the heating system upstream of the heating system, whereby a flow of return air from the chamber passes through and is filtered by an air filter of the air filter assembly before flowing to the heating system;
    a housing, the air filter positioned within the housing; and
    a drain path extending through the housing, wherein the air filter assembly is removably positioned in the housing,
    wherein the housing comprises a guide rail, the air filter configured to translate in a travel direction along the guide rail between an inserted position in the housing and an extracted position at least partially outside of the housing, and wherein the guide rail is discontinuous along the travel direction.

2. The laundry appliance of claim 1, wherein the air filter assembly comprises an upstream side and a downstream side, wherein the drain path extends between the upstream side of the air filter assembly and the downstream side of the air filter assembly.

3. The laundry appliance of claim 2, wherein the downstream side of the air filter assembly faces the heating system.

4. The laundry appliance of claim 2, further comprising a return duct extending from the tub to an outlet defined in the housing, wherein the upstream side of the air filter assembly faces the outlet.

5. The laundry appliance of claim 1, further comprising a return duct extending from the tub to an outlet defined in the housing, wherein the housing comprises a floor, wherein the floor of the housing defines a pitch, and wherein the pitch of the floor of housing is oriented towards the outlet.

6. The laundry appliance of claim 1, wherein the housing comprises a floor, wherein the air filter assembly comprises a guide surface, the guide surface in contact with a top of the guide rail when the air filter assembly is in the inserted position, wherein the guide rail defines a height above the floor of the housing, and wherein a bottom surface of the air filter assembly is spaced apart from the floor of the housing along a vertical direction when the air filter assembly is in the inserted position.

7. The laundry appliance of claim 1, further comprising a water channel defined in a floor of the housing, wherein the water channel defines at least a portion of the drain path.

8. The laundry appliance of claim 7, wherein the air filter assembly is insertable into and removable from the housing through a filter gate in the housing, and wherein the water channel is defined in the floor of the housing proximate the filter gate along the travel direction.

9. A laundry appliance, comprising:
    a cabinet defining an interior volume;
    a housing mounted within the interior volume of the cabinet;
    an air filter assembly positioned in the housing;
    a drain path extending through the housing; and
    a return duct extending to an outlet defined in the housing, wherein the housing comprises a floor, wherein the floor of the housing defines a pitch, and wherein the pitch of the floor of housing is oriented towards the outlet.

10. The laundry appliance of claim 9, wherein the air filter assembly comprises an upstream side and a downstream side, wherein the drain path extends between the upstream side of the air filter assembly and the downstream side of the air filter assembly.

11. The laundry appliance of claim 10, wherein the downstream side of the air filter assembly faces a heating system of the laundry appliance.

12. The laundry appliance of claim 10, wherein the upstream side of the air filter assembly faces the outlet.

13. The laundry appliance of claim 9, wherein the air filter assembly is removably positioned in the housing, wherein the housing comprises a guide rail, the air filter assembly configured to translate in a travel direction along the guide rail between an inserted position in the housing and an extracted position at least partially outside of the housing, and wherein the guide rail is discontinuous along the travel direction.

14. The laundry appliance of claim 13, wherein the air filter assembly comprises a guide surface, the guide surface in contact with a top of the guide rail when the air filter is in the inserted position, wherein the guide rail defines a height above the floor of the housing, and wherein a bottom surface of the air filter assembly is spaced apart from the floor of the housing along a vertical direction when the air filter assembly is in the inserted position.

15. The laundry appliance of claim 9, further comprising a water channel defined in the floor of the housing, wherein the water channel defines at least a portion of the drain path.

16. The laundry appliance of claim 15, wherein the air filter assembly is removably positioned in the housing whereby the air filter assembly is removable from the housing by sliding in a travel direction between an inserted position in the housing and an extracted position at least partially outside of the housing, wherein the air filter assembly is insertable into and removable from the housing through a filter gate in the housing, and wherein the water channel is defined in the floor of the housing proximate the filter gate along the travel direction.

17. A laundry appliance, comprising:
   a cabinet defining an interior volume;
   a housing mounted within the interior volume of the cabinet;
   an air filter assembly positioned in the housing;
   a drain path extending through the housing; and
   a water channel defined in a floor of the housing, wherein the water channel defines at least a portion of the drain path, wherein the air filter assembly is removably positioned in the housing whereby the air filter assembly is removable from the housing by sliding in a travel direction between an inserted position in the housing and an extracted position at least partially outside of the housing, wherein the air filter assembly is insertable into and removable from the housing through a filter gate in the housing, and wherein the water channel is defined in the floor of the housing proximate the filter gate along the travel direction.

18. The laundry appliance of claim 17, wherein the air filter assembly comprises an upstream side and a downstream side, wherein the drain path extends between the upstream side of the air filter assembly and the downstream side of the air filter assembly.

19. The laundry appliance of claim 17, further comprising a return duct extending from the tub to an outlet defined in the housing, wherein the housing comprises a floor, wherein the floor of the housing defines a pitch, and wherein the pitch of the floor of housing is oriented towards the outlet.

20. The laundry appliance of claim 17, wherein the housing comprises a guide rail, wherein the air filter assembly comprises a guide surface, the guide surface in contact with a top of the guide rail when the air filter assembly is in the inserted position, wherein the guide rail defines a height above the floor of the housing, and wherein a bottom surface of the air filter assembly is spaced apart from the floor of the housing along a vertical direction when the air filter assembly is in the inserted position.

* * * * *